Feb. 19, 1929.
C. O. ENGMAN
1,702,537
PLANT LIFTER FOR CULTIVATORS
Filed May 20, 1927
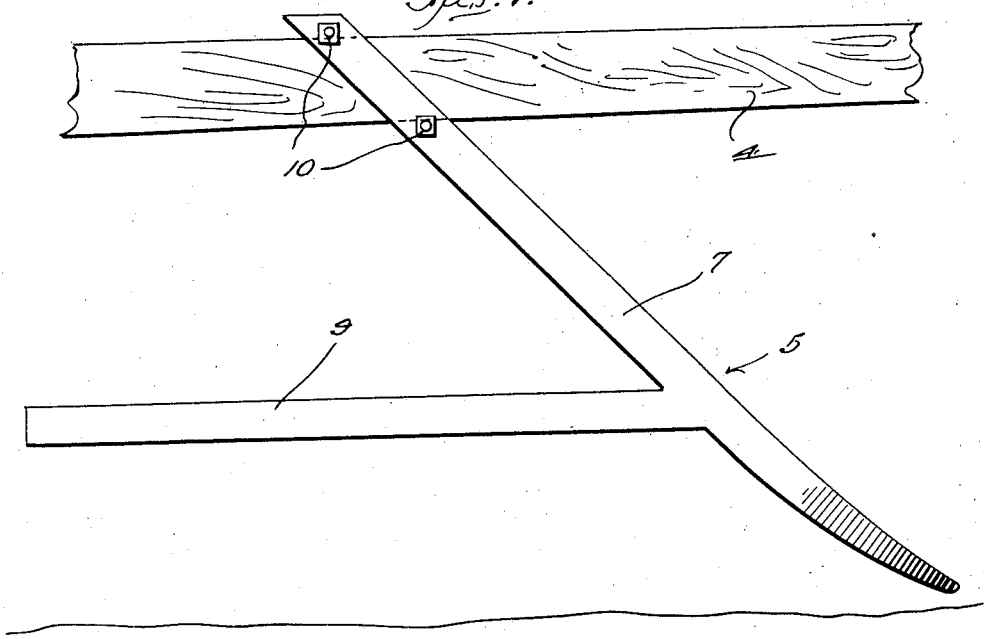
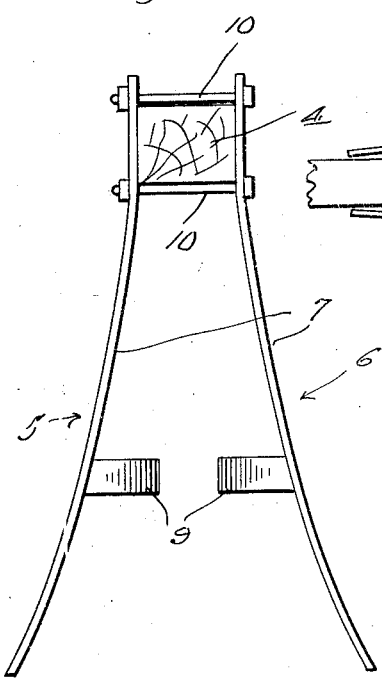
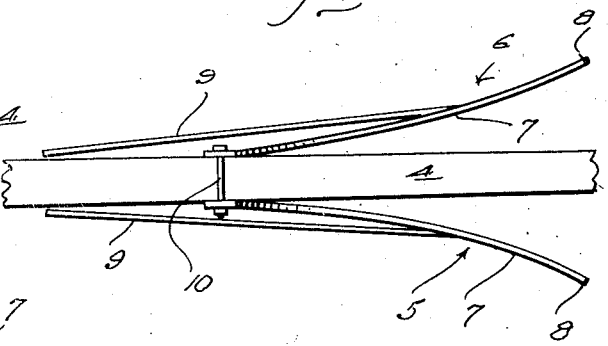
Inventor
*Clarence O. Engman*
By *Clarence A. O'Brien*
Attorney Patented Feb. 19, 1929.

1,702,537

UNITED STATES PATENT OFFICE.

CLARENCE O. ENGMAN, OF MITCHELL, SOUTH DAKOTA.

PLANT LIFTER FOR CULTIVATORS.

Application filed May 20, 1927. Serial No. 192,963.

The present invention relates to an improved accessory for attachment to conventional cultivators, and in view of the function which it serves, it may be conveniently entitled a plant lifter for cultivators, such as are employed extensively in corn fields.

There are several different manufacturing concerns which make and market machines known as listed corn cultivators. To my knowledge there are three types of these now on the market; a single row type, a two row type and a three row type, and, as stated, they are known as listed corn cultivators. They are very beneficial to farmers in localities where corn is planted by means of a lister. Most all farmers using these constructions of cultivators are troubled with one difficulty, for example, under certain conditions these cultivators cover certain of the corn plants. If the corn becomes wilted from heat, the leaves drop down into the furrows. In heavy rain, the ground frequently loosens and allows the entire stalk to fall over to one side or the other. This disarrangement of the plants also occurs from heavy wind. In any case, the cultivator wheels run over the corn plants, either breaking or cutting them off entirely, or holding them down until they become covered with dirt, turned over them by cultivator discs. Efforts have been made by the manufacturers to partially overcome this detriment and wastage by placing shields between the discs to protect the plants, but these are only partially effective, and in some instances they are defective for they aid in tramping down the corn stalks.

At the present time, many farmers carry a stick with them and endeavor to pick up the fallen stubs and guide them into the shield. However, they cannot act quickly enough to pick up the corn even in one row and when it comes to using the double or triple types of machines the work becomes a drudgery, for which reason the double and triple row types are frequently not used.

What I propose is a simple and inexpensive attachment to be suspended from the cultivator beam in a position to literally scoop up the inclined stalks and to guide them in an erect position into the shield.

I aim particularly to provide an attachment of this kind which is such in construction as to permit it to be attached to the beam without requiring alteration of the stock parts of the machine and without interfering with the operation of any of these parts. The particular construction of the device will become more readily apparent from the following description and drawing.

In the drawing:

Figure 1 represents a side view of a cultivator beam with the attachment mounted thereto.

Figure 2 is a front view of the same.

Figure 3 is a top plan view thereof.

Referring to the drawing in detail, it will be seen that the reference character 4 designates the customary cultivator beam upon which the device is mounted. The device is composed of two duplicate parts 5 and 6 respectively. Each part comprises an arm 7, in the form of a flat metal strap of appropriate dimension. This arm is reduced in width at its lower end to provide a lifting finger. It will be noted that the lifting fingers of the respective arms are bowed outwardly and away from each other as indicated better in Figures 2 and 3. These fingers terminate in closed spaced relation to the surface of the ground. Each arm 7 carries a rearwardly extending and horizontally disposed guide arm 9. Each arm 9 is disposed at an acute angle to the arms 7. For the purpose of distinction, the arm 7 will be defined as the lifting arm, while the arm 9 will be defined as the guide arm. These two parts 5 and 6 are fastened upon the beam 4 by way of bolts 10 the bolts being so arranged as to permit the arms 7 to incline downwardly and forwardly and to dispose the arms 9 in a substantial plane with the surface of the ground. Incidentally, it will be noted that the arms 9 are directed toward each other, at their free or rear ends, and in practice, they are of a length to terminate in close proximity to the customary shield (not shown). In practice, as the cultivator travels along the row, the fallen stubs are lifted up on the arms 7 and carried between the arms 9, and the last named arms serve to hold them in an erect position, until they enter the shield. The continuity of action of the attachment with the shield will be quite clear to persons skilled in the art to which the invention relates, and particularly to persons familiar with types of cultivators herein referred to.

It is believed that by carefully considering the detailed description in connection with the drawings, a clear understanding of the construction, method of attachment and operation of the invention will be had. Therefore a more lengthy description is thought unnecessary.

While the preferred embodiment of the invention has been shown and described, it is to be understood that minor changes in shape, size, and arrangement, coming within the field of invention claimed, may be resorted to, if desired.

I claim:

A plant lifter and guide comprising a pair of complemental parts, each part embodying a lifting arm provided with an intermediate rearwardly extending guide arm, the guide arm being disposed at a substantially acute angle to the lifting arm, the lifting arms of the respective parts being disposed opposite each other, the guide arms being disposed opposite each other, and the lifting arms terminating in outwardly bowed pointed extremities at their lower ends.

In testimony whereof I affix my signature.

CLARENCE O. ENGMAN.